(12) United States Patent
Sasaki et al.

(10) Patent No.: US 7,804,561 B2
(45) Date of Patent: Sep. 28, 2010

(54) COLORED COMPOSITION FOR COLOR FILTERS, COLOR FILTER AND LIQUID CRYSTAL DISPLAY DEVICE

(75) Inventors: Hiroshi Sasaki, Tokyo (JP); Kazunori Yamada, Tokyo (JP); Yusuke Iida, Tokyo (JP); Noriko Asashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 527 days.

(21) Appl. No.: 11/651,527

(22) Filed: Jan. 10, 2007

(65) Prior Publication Data

US 2007/0247565 A1 Oct. 25, 2007

(30) Foreign Application Priority Data

Jan. 13, 2006 (JP) .............................. 2006-005626
Jul. 26, 2006 (JP) .............................. 2006-203718

(51) Int. Cl.
*G02F 1/1335* (2006.01)
(52) U.S. Cl. ...................... 349/106; 349/107; 349/108; 349/61; 349/62; 349/63; 349/64; 349/65; 349/66; 349/67; 349/68; 349/69; 349/70; 349/71; 313/503
(58) Field of Classification Search .......... 349/106–108
See application file for complete search history.

(56) References Cited

U.S. PATENT DOCUMENTS

| | | | |
|---|---|---|---|
| 6,483,562 B1* | 11/2002 | Fukuyoshi et al. ........... | 349/113 |
| 7,220,534 B2 | 5/2007 | Ikegami et al. | |
| 7,495,722 B2* | 2/2009 | Roth et al. ................... | 349/106 |
| 7,649,310 B2 | 1/2010 | Ishii et al. | |
| 2004/0234872 A1* | 11/2004 | Horiguchi ...................... | 430/7 |
| 2004/0236006 A1* | 11/2004 | Tanaka et al. ................ | 524/543 |
| 2005/0134785 A1* | 6/2005 | Roth et al. ................... | 349/144 |
| 2005/0219443 A1 | 10/2005 | Tanaka et al. | |
| 2006/0222969 A1* | 10/2006 | Jonoshita et al. ............... | 430/7 |

FOREIGN PATENT DOCUMENTS

| | | |
|---|---|---|
| JP | 10-186124 | 7/1998 |
| JP | 2005-49791 | 2/2005 |
| JP | 1629727 | 6/2005 |
| JP | 1680833 | 10/2005 |
| WO | WO 2005/064366 | 7/2005 |
| WO | WO 2006/068141 | 6/2006 |

OTHER PUBLICATIONS

Chinese Patent Office Action, mailed Jun. 6, 2008 and issued in corresponding Chinese Patent Application No. 2007100022180.

* cited by examiner

*Primary Examiner*—David Nelms
*Assistant Examiner*—Thanh-Nhan P Nguyen
(74) *Attorney, Agent, or Firm*—Staas & Halsey LLP (57) ABSTRACT

A cyan-colored composition for a color filter contains a phthalocyanine blue pigment comprising either of C.I. Pigment Blue 15:3 and C.I. Pigment Blue 15:4, or both, a phthalocyanine green pigment comprising C.I. Pigment Green 7, and a pigment carrier consisting of a transparent resin, a precursor of the resin or a mixture thereof. A color filter includes a red-colored filter segment, a green-colored filter segment, a blue-colored filter segment, and a cyan-colored filter segment or a yellow-colored filter segment.

9 Claims, 2 Drawing Sheets

COLORED COMPOSITION FOR COLOR FILTERS, COLOR FILTER AND LIQUID CRYSTAL DISPLAY DEVICE

CROSS-REFERENCE TO RELATED APPLICATIONS

This application is based upon and claims the benefit of priority from prior Japanese Patent Applications No. 2006-5626, filed Jan. 13, 2006 and No. 2006-203718, filed Jul. 26, 2006, the entire contents of both of which are incorporated herein by reference.

BACKGROUND OF THE INVENTION

1. Field of the Invention

The present invention relates to a colored composition for a color filter used in the manufacture of, e.g., a color liquid crystal display device or a color image pickup tube device, to a color filter, and to a liquid crystal display device.

2. Description of the Related Art

In recent years, a color liquid display device has been employed as a monitor for televisions, a monitor for personal computers, a mobile device, etc., and the color filter employed in the color liquid display device has been increased in demanded levels of various properties, including, in addition to brightness and color purity, for each of the color filter segments, uniformity of coating, sensitivity, developing property, patterned shape, etc. Further, since the color filter is used for a long period of time, the qualities thereof, such as heat resistance and light fastness, are also strongly demanded to be excellent. In particular, concomitantly with the propagation of liquid display devices, the color filter is strongly demanded to have a further enhanced contrast and a further enlarged color reproducing area in order to meet the demand to reproduce clear-cut and bright colors.

Jpn. Pat. Appln. KOKAI Publication No. 10-186124 discloses a method for realizing excellent color reproducing areas of high brightness by specifying the CIE color specification values of x, y and Y for each of red, green and blue color filter segments constituting a color filter and specifying the pigments and the mixing ratio and grain size thereof.

JA-A 2005-49791 (KOKAI) discloses a method for enlarging the color reproducing area by adding a cyanine color filter segment having a specified CIE color specification value to a red-colored filter segment, a green-colored filter segment and a blue-colored filter segment.

However, even in any of the methods described above, enlargement of the color reproducing area of a liquid crystal display device is insufficient, and hence, a liquid crystal display device which has further improved color reproducing properties is required.

BRIEF SUMMARY OF THE INVENTION

Therefore, it is an object of the present invention to provide a color filter which is high in contrast and excellent in light fastness and also wide in color reproducing area, as well as a cyan-colored composition which is useful in the manufacture of such a color filter, and a liquid crystal display device which is capable of reproducing clear-cut and bright colors.

According to a first aspect of the present invention, there is provided a cyan-colored composition for a color filter, which comprises a phthalocyanine blue pigment comprising either of C.I. Pigment Blue 15:3 and C.I. Pigment Blue 15:4, or both, a phthalocyanine green pigment comprising C.I. Pigment Green 7, and a pigment carrier consisting of a transparent resin, a precursor of the resin or a mixture thereof.

According to a second aspect of the present invention, there is provided a color filter comprising a cyan-colored filter segment formed from a cyan-colored composition according to the present invention, a red-colored filter segment, a green-colored filter segment and a blue-colored filter segment.

According to a third aspect of the present invention, there is provided a color filter comprising a red-colored filter segment, a green-colored filter segment, a blue-colored filter segment and a yellow-colored filter segment, wherein the yellow-colored filter segment is formed by using a yellow-colored composition comprising a yellow pigment, a pigment dispersant, and a pigment carrier consisting of a transparent resin, a precursor of the resin or a mixture thereof.

According to a fourth aspect of the present invention, there is provided a liquid crystal display device comprising a color filter according to the present invention and a pseudo-white LED light source formed of a blue LED whose surface is coated with a phosphor, wherein the pseudo-white LED light source has spectral properties such that it has a wavelength $\lambda 1$ at which the emission intensity becomes the highest, within a wavelength range of 430 nm to 485 nm, and also has a peak wavelength $\lambda 2$ of emission within a wavelength range of 530 nm to 580 nm and a ratio of an emission intensity $I2$ at the wavelength $\lambda 2$ to an emission intensity $I1$ at the wavelength $\lambda 1$, $I2/I1$, is 0.2 or more, but 0.7 or less.

According to a fifth aspect of the present invention, there is provided a liquid crystal display device comprising a color filter according to the present invention, and a cold-cathode fluorescent tube light source, wherein the cold cathode fluorescent tube light source has spectral properties such that it has a wavelength $\lambda 3$ at which the emission intensity becomes the local maximum, within a wavelength range of 470 nm to 530 nm, and also has a wavelength $\lambda 4$ at which the emission intensity becomes the highest, within a wavelength range of 530 nm to 580 nm, and a ratio of the emission intensity $I3$ at the wavelength $\lambda 3$ to the emission intensity $I4$ at the wavelength $\lambda 4$, $I3/I4$, is 0.2 or more but 0.7 or less.

According to a sixth aspect of the present invention, there is provided a liquid crystal display device comprising a color filter according to the present invention and a three-color LED light source, wherein the three-color LED light source has spectral properties such that it has a wavelength $\lambda 5$ at which the emission intensity becomes the highest, within a wavelength range of 430 nm to 485 nm and also has a wavelength $\lambda 6$ at which becomes local maximum, within a wavelength range of 530 nm to 580 nm, and a ratio of the emission intensity $I6$ at the wavelength $\lambda 6$ to the emission intensity $I5$ at the wavelength $\lambda 5$, $I6/I5$, is 0.2 or more, but 0.7 or less.

DETAILED DESCRIPTION OF THE INVENTION

First, a cyan-colored composition will be explained.

A cyan-colored composition for a color filter according to the present invention comprises (i) a phthalocyanine blue pigment comprising either of C.I. Pigment Blue 15:3 and C.I. Pigment Blue 15:4, or both, (ii) a phthalocyanine green pigment comprising C.I. Pigment Green 7 and (iii) a pigment carrier consisting of a transparent resin, a precursor of the resin or a mixture thereof. Incidentally, "C.I." represents a color index.

The phthalocyanine blue pigment (i) comprises either of C.I. Pigment Blue 15:3 and C.I. Pigment Blue 15:4 or both, and may further comprise other phthalocyanine blue pigment(s). As the other phthalocyanine blue pigments, use may be made of, e.g., C.I. Pigment Blue 15:1, C.I. Pigment Blue 15:2, C.I. Pigment Blue 15:6, C.I. Pigment Blue 16, and C.I. Pigment Blue 75.

It is preferred for C.I. Pigment Blue 15:3 and/or C.I. Pigment Blue 15:4 to occupy, in total, 20 to 100% by weight of the total weight of the phthalocyanine blue pigment. If the amount of C.I. Pigment Blue 15:3 and/or C.I. Pigment Blue 15:4 is less than 20% by weight of the total weight of the phthalocyanine blue pigment, the color reproducing area obtained when the colored composition is fabricated into a panel will be narrowed and the light fastness thereof will be deteriorated, which are not preferable.

The phthalocyanine green pigment (ii) comprises C.I. Pigment green 7, and may further comprise other phthalocyanine green pigment(s). Examples of other phthalocyanine green pigments include C.I. Pigment Green 36.

It is preferred for C.I. Pigment Green 7 to occupy 20 to 100% by weight of the total weight of the phthalocyanine green pigment. If the amount of C.I. Pigment Green 7 is less than 20% by weight of the total weight of the phthalocyanine blue pigment, the color reproducing area obtained when the colored composition is fabricated into a panel will be narrowed, which is not preferable.

In the cyan-colored composition for a color filter according to the present invention, the phthalocyanine blue pigment (i) and the phthalocyanine green pigment (ii) are contained at a weight ratio of 1:99 to 99:1, preferably 3:97 to 97:3, most preferably 5:95 to 95:5. When the amount of the phthalocyanine blue pigment (i) falls outside the aforementioned range, enlargement of the color reproducing area will be insufficient, which is not preferable.

It is preferable that at least one of the phthalocyanine blue pigment (i) and the phthalocyanine green pigment (ii) is finely pulverized by kneading a mixture containing the pigment in question, a water-soluble inorganic salt and a water-soluble organic solvent which substantially does not dissolve the water-soluble inorganic salt (this operation is called salt milling), and then removing the water-soluble inorganic salt and water-soluble organic solvent. When the finely pulverized pigment is used, the spectral transmittance of a filter segment and the contrast are enhanced. During the salt milling, a pigment derivative, to be described hereinafter, and a resin which is at least partially soluble in the water-soluble organic solvent may be additionally used. By using the finely pulverized pigment obtained by these treatments, a filter segment of improved optical properties may be formed.

Next, there will be explained a yellow-colored composition used for forming a yellow-colored filter segment which a color filter according to the third aspect of the present invention may comprise.

The yellow-colored composition used for forming a yellow-colored filter segment comprises (a) a yellow pigment; (b) a pigment dispersant; and (c) a pigment carrier consisting of a transparent resin, a precursor of the resin or a mixture thereof.

It is preferred that the pigment used in the yellow-colored composition occupies 5 to 50% by weight the total weight of the solids (components other than the solvent) of the yellow-colored composition, in view of the tinting power and stability of the yellow-colored composition.

As the yellow pigment, it is preferable to use at least one yellow pigment selected from the group consisting of C.I. Pigment Yellows 138, 139, 150 and 185 in view of dispersibility of pigment, of the chromaticity obtained when a pseudo-white LED formed of a blue LED whose surface is coated with a phosphor is employed as a light source, and of the light fastness thereof. Examples of other useful yellow pigments include C.I. Pigment Yellows 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 198, 213 and 214.

It is preferable that the yellow pigment is finely pulverized by subjecting a mixture containing the yellow pigment, a water-soluble inorganic salt and a water-soluble organic solvent which substantially does not dissolving the water-soluble inorganic salt to a salt milling, and removing the water-soluble inorganic salt and water-soluble organic solvent. During the salt milling, a basic group-containing derivative, a resin which is at least partially soluble in the water-soluble organic solvent or a dispersant may be additionally used. When the finely pulverized yellow pigment obtained by these treatments is used, a yellow-colored filter segment of further improved optical properties may be formed.

In order to more secure an excellent coating property, sensitivity and developing property while keeping the balance between chroma and lightness, the cyan- or yellow-colored composition of the present invention may further comprise an inorganic pigment such as titanium oxide, barium sulfate, zinc white, lead sulfate, yellow lead, zinc yellow, red ochre (red iron (III) oxide), cadmium red, ultramarine, Prussian blue, chromium oxide green, cobalt green, amber, titanium black, synthetic iron black, or carbon black. If these inorganic pigments are incorporated into the cyan-colored composition of the present invention, the amount thereof preferably occupies 0.1 to 10% by weight of the total weight of the pigments. Further, if a pigment other than yellow pigment is incorporated into the yellow-colored composition of the present invention, the amount of the yellow pigment preferably occupies 3 to 70% by weight of the total weight of the pigments in view of the lightness of the yellow-colored composition.

The pigment carrier contained in the cyan-colored composition or the yellow-colored composition of the present invention disperses the pigments therein, and is provided by a transparent resin, a precursor or a mixture of thereof. The transparent resin is a resin having a light transmittance of, preferably 80% or more, more preferably 95% or more, in the whole visible wavelength region ranging from 400 to 700 nm. The transparent resin includes a thermoplastic resin, a thermosetting resin and an active energy beam-curable resin, and the precursor thereof includes a monomer or an oligomer, which forms a transparent resin upon curing by the irradiation of active energy beam. They may be used singly or in combination of two or more kinds. The pigment carrier can be used in an amount of preferably 50 to 700 parts by weight, more preferably 100 to 400 parts by weight, based on 100 parts by weight of the total of the pigments.

Examples of the thermoplastic resin include, for example, a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a polystyrene resin, a polyamide resin, a rubber resin, a cyclized rubber resin, a cellulose, a polyethylene (HDPE, LDPE), a polybutadiene, and a polyimide resin. Further, examples of the thermosetting resin include, for example, an epoxy resin, a benzoguanamine resin, a rosin-modified maleic acid resin, a rosin-modified fumaric acid resin, a melamine resin, a urea resin, and a phenolic resin.

As the active energy beam-curable resin, use may be made of resins formed by reacting a polymer having a reactive substituent, such as a hydroxyl group, carboxyl group or amino group, with a (meth)acrylic compound having a reactive substituent such as isocyanato group, aldehydro group or epoxy group, or with cinnamic acid, thereby introducing a photo-crosslinkable group, such as a (meth)acryloyl group or styryl group, introduced into the polymer. Also, it is also possible to use a linear polymer containing an acid anhydride, such as a styrene-maleic anhydride copolymer or an α-olefin-maleic anhydride copolymer, which has been half-esterified with a (meth)acrylic compound having a hydroxyl group, such as hydroxyalkyl (meth)acrylate.

The pigment carrier is preferably comprises a resin formed of (a) a compound represented by General Formula (1) below, copolymerized with (b) another compound having an ethylenically unsaturated double bond. Since this transparent copolymer is capable of giving excellent dispersing effects to almost all kinds of pigments, it serves to prevent the aggregation of the pigments in the colored composition and enables the pigments to maintain a finely dispersed state in the colored composition. Therefore, when a filter segment is formed by using the cyan-colored composition of the present invention where the pigment is dispersed in a pigment carrier comprising the aforementioned transparent copolymer, it is possible to form a filter segment which is minimal in aggregates of the pigment and hence to manufacture a color filter which is excellent in transmittance and in lightness.

General Formula (1):

In Formula (1), $R_{14}$ denotes a hydrogen atom or a methyl group, and $R_{15}$ denotes an alkylene group. $R_{16}$ denotes a hydrogen atom or an alkyl group having 1 to 20 carbon atoms, which may contain a substituent such as a benzene ring. m denotes an integer of 1 to 15.

The compound (a) represented by General Formula (1), which is a constituent component of the aforementioned transparent copolymer, is excellent in adsorption/orientation on the surface of the pigment due to the effects of π electron of the benzene ring. Especially, when this compound (a) is an ethylene oxide- or propylene oxide-modified (meth)acrylate of para-cumyl phenol, it is possible to provide a further improved adsorption/orientation surface to the pigment, due to the additional steric effects brought about by these compounds. Further, although the number of carbon atoms of the alkyl group represented by $R_{16}$ is 1 to 20, it is more preferably 1 to 10. When the number of carbon atoms of the alkyl group represented by $R_{16}$ is 1 to 10, said alkyl group provides a steric hindrance to thereby inhibit the resin molecules from approaching each other, thus promoting the adsorption/orientation to the pigment. However, when the number of carbon atoms of the alkyl group is more than 10, the effects of steric hindrance will be excessively increased to such an extent that even the adsorption/orientation of the benzene ring to the surface of the pigment will be obstructed. This becomes more prominent as the chain length of the alkyl group represented by $R_{16}$ becomes longer, and when the number of carbon atoms of the alkyl group is more than 20, the adsorption/orientation of the benzene ring to the surface of the pigment is caused to greatly deteriorate.

Examples of the compound (a) include a phenol ethylene oxide-modified (meth)acrylate, para-cumyl phenol ethylene oxide-modified (meth)acrylate, nonyl phenol ethylene oxide-modified (meth)acrylate, and nonyl phenol propylene oxide-modified (meth)acrylate.

Examples of the compound (b) include (meth)acrylic acid, methyl (meth)acrylate, (iso)propyl (meth)acrylate, (iso)butyl (meth)acrylate, (iso)pentyl (meth)acrylate, 2-hydroxyethyl (meth)acrylate, 2-hydroxypropyl (meth)acrylate, benzyl (meth)acrylate, cyclohexyl (meth)acrylate, glycidyl (meth)acrylate, isobonyl (meth)acrylate, acid phosphoxyethyl (meth)acrylate, acid phosphoxypropyl (meth)acrylate, trichloro di-acid phosphoxyethyl (meth)acrylate, and acid phosphoxy polyethylene glycol mono(meth)acrylate.

The proportion of the compound (a) in the aforementioned transparent copolymer is preferably 0.1 to 50% by weight, more preferably 10 to 35% by weight. If the proportion of the compound (a) is less than 0.1% by weight, it will be difficult to obtain a sufficient pigment dispersing effect. If the proportion of the compound (a) exceeds 50% by weight, the compatibility thereof with other constituent components of the colored composition will be deteriorated, thereby occasionally causing the precipitation of the monomer or a photopolymerization initiator.

The weight average molecular weight (Mw) of the aforementioned transparent resin is preferably 5000 to 100000, more preferably 10000 to 50000.

Examples of the monomer and oligomer constituting the pigment carrier include various kinds of acrylic esters and methacrylic esters such as methyl (meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, polyethylene glycol (meth)acrylate, 1,6-hexanediol di(meth)acrylate, triethylene glycol di(meth)acrylate, tripropylene glycol di(meth)acrylate, trimethylolpropane tri(meth)acrylate, pentaerythritol tri(meth)acrylate, 1,6-hexanediol glycidylether di(meth)acrylate, bisphenol A diglycidylether di(meth)acrylate, neopentyl glycol diglycidylether di(meth)acrylate, dipentaerythritol hexa (meth)acrylate, tricyclodecanyl (meth)acrylate, ester acrylate, (meth)acrylic ester of methylolated melamine, epoxy (meth)acrylate, and urethane acrylate; (meth)acrylic acid; styrene; vinyl acetate; hydroxyethyl vinyl ether; ethylene glycol divinyl ether, pentaerythritol trivinyl ether, (meth)acrylamide, N-hydroxymethyl (meth)acrylamide; N-vinylformamide, and acrylonitrile. These compounds may be used singly or in combination of two or more kinds.

The cyan- or yellow-colored composition of the present invention can be prepared by finely dispersing the predetermined pigments, together with a photopolymerization initiator described below, if necessary, in the pigment carrier, by using a dispersing device such as a three-roll mill, a two-roll mill, a sand mill, a kneader or an attritor. When two or more kinds of pigments are employed, these pigments are mixed together in advance and then the pigment mixture thus obtained is finely dispersed in the pigment carrier, thus preparing the colored composition.

A dispersing aid such as a pigment derivative, a resin type pigment dispersant, or a surfactant may be utilized in dispersing the pigments in the pigment carrier. Since the dispersing aid is excellent in dispersing pigments and is very effective in preventing the pigments from being re-aggregated subsequent to the initial dispersing thereof, it is possible to create a color filter which is excellent in transparency if a colored composition is used in which the pigments are dispersed in the pigment carrier using the dispersing aid. The dispersing aid may be used in an amount of 0.1 to 30 parts by weight based on 100 parts by weight of the pigments in total.

The aforementioned pigment derivative can be represented by the following General Formula (2) and includes one having a basic substituent and one having an acidic substituent.

A-B    Formula (2)

In Formula (2), A denotes an organic pigment residual group and B denotes a basic substituent or an acidic substituent.

Examples of an organic pigment constituting the organic pigment residual group represented by A in Formula (2) include a diketopyrrolopyrrole pigment; an azo pigment such as an azo, diazo or polyazo; a phthalocyanine pigment such as a copper phthalocyanine, a halogenated copper phthalocyanine, a metal-free phthalocyanine; an anthraquinone pigment such as amino anthraquinone, diamino dianthraquinone, anthrapyrimidine, flavanthrone, anthoanthrone, indanthrone, pyranthrone, violanthrone; a quinacridone pigment; a dioxazine pigment; a perinone pigment; a perylene pigment; a thioindigo pigment; an isoindoline pigment; an isoindolinone pigment; a quinophthalone pigment; a thren pigment; and a metal complex pigment.

Examples of the basic substituent represented by B in Formula (2) include the substituents represented respectively by the following Formulas (3), (4), (5) and (6). Examples of the acidic substituents represented by B in Formula (2) include the substituents represented respectively by the following Formulas (7), (8) and (9).

Formula (3):

Formula (4):

Formula (5):

Formula (6):

In Formulas (3) to (6), X denotes $-SO_2-$, $-CO-$, $-CH_2NHCOCH_2-$, $-CH_2-$ or direct bond.

In Formulas (3) to (6), n denotes an integer of 1-10.

In Formulas (3) to (6), $R_1$ and $R_2$ denote independently an alkyl group having 1-36 carbon atoms, which may be substituted, an alkenyl group having 2-36 carbon atoms, which may be substituted, or a phenyl group, which may be substituted, or $R_1$ and $R_2$, taken together, denote a heterocyclic group which may additionally contain a nitrogen, oxygen or sulfur atom and which may be substituted.

In Formulas (3) to (6), $R_3$ denotes an alkyl group having 1-36 carbon atoms, which may be substituted, an alkenyl group having 2-36 carbon atoms, which may be substituted, or a phenyl group, which may be substituted.

In Formulas (3) to (6), $R_4$, $R_5$, $R_6$ and $R_7$ denote independently a hydrogen atom, an alkyl group having 1-36 carbon atoms, which may be substituted, an alkenyl group having 2-36 carbon atoms, which may be substituted, or a phenyl group, which may be substituted.

In Formulas (3) to (6), Y denotes $-NR_8-Z-NR_9-$ or a direct bond, wherein $R_8$ and $R_9$ denoted independently a hydrogen atom, an alkyl group having 1-36 carbon atoms, which may be substituted, an alkenyl group having 2-36 carbon atoms, which may be substituted, or a phenyl group, which may be substituted.

In Formulas (3) to (6), Z denotes an alkylene group having 1-36 carbon atoms, which may be substituted, an alkenylene group having 2-36 carbon atoms, which may be substituted, or a phenyl group, which may be substituted.

In Formulas (3) to (6), R denotes a substituent represented by the following Formula (10) or a substituent represented by the following Formula (11).

In Formulas (3) to (6), Q denotes a hydroxyl group, an alkoxyl group, a substituent represented by the following Formula (10) or a substituent represented by the following Formula (11).

Formula (10):

-continued

Formula (11):

In Formulas (10) and (11), $R_6$-$R_7$ and n are as defined above.

Formula (7):

—SO$_3$M

Formula (8):

—COOM

Formula (9):

In Formulas (7) and (8), M denotes a 1/i hydrogen atom, calcium atom, barium atom, strontium atom, manganese atom or aluminum atom, wherein i denotes the valence of M. For example, in Formula (7), M denotes one hydrogen atom, or ½ of a calcium atom (in this case, two COO— groups are bonded to a single calcium atom).

In Formula (9), $R_{10}$, $R_{11}$, $R_{12}$ and $R_{13}$ represent independently a hydrogen atom, an alkyl group having 1-36 carbon atoms, which may be substituted, an alkenyl group having 2-36 carbon atoms, which may be substituted, a phenyl group, which may be substituted, or a polyoxyalkylene group.

Examples of the amine component used to form the substituent represented by Formulas (3) to (6), (10) and (11) include, for example, dimethylamine, diethylamine, N,N-ethylisopropylamine, N,N-ethylpropylamine, N,N-methylbutylamine, N,N-methylisobutylamine, N,N-butylethylamine, N,N-tert-butylethylamine, diisopropylamine, dipropylamine, N,N-sec-butylpropylamine, dibutylamine, di-sec-butylamine, diisobutylamine, N,N-isobutyl-sec-butylamine, diamylamine, diisoamylamine, dihexylamine, di(2-ethylhexyl)amine, dioctylamine, N,N-methyloctadecylamine, didecylamine, diallylamine, N,N-ethyl-1,2-dimethylpropylamine, N,N-methylhexylamine, dioleylamine, distearylamine, N,N-dimethylaminomethylamine, N,N-dimethylaminoethylamine, N,N-dimethylaminoamylamine, N,N-dimethylaminobutylamine, N,N-diethylaminoethylamine, N,N-diethylaminopropylamine, N,N-diethylaminohexylamine, N,N-diethylaminobutylamine, N,N-diethylaminopentylamine, N,N-dipropylaminobutylamine, N,N-dibutylaminopropylamine, N,N-dibutylaminoethylamine, N,N-dibutylaminobutylamine, N,N-diisobutylaminopentylamine, N,N-methyl-laurylaminopropylamine, N,N-ethylhexylaminoethylamine, N,N-distearylaminoethylamine, N,N-dioleylaminoethylamine, N,N-distearylaminobutylamine, piperidine, 2-pipecoline, 3-pipecoline, 4-pipecoline, 2,4-lupetidine, 2,6-lupetidine, 3,5-lupetidine, 3-piperidinemethanol, pipecolic acid, isonipecotic acid, methyl isonipecotate, ethyl isonipecotate, 2-piperidineethanol, pyrrolidine, 3-hydroxypyrrolidine, N-aminoethylpiperidine, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-methylpiperazine, N-butylpiperazine, N-methylhomopiperazine, 1-cyclopentylpiperazine, 1-amino-4-methylpiperazine, and 1-cyclopentylpiperazine.

The amine component used to form the amine salt of sulfonic acid of Formula (9) may be any of a primary amine, a secondary amine, a tertiary amine and a quaternary amine. For example, the primary amine includes amines such as hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine and eicocylamine, each of which may have a side chain, and unsaturated amines having the number of carbon atoms corresponding to that of the aforementioned amines.

Examples of the secondary amine, tertiary amine and quaternary amine mentioned above include dioleylamine, distearylamine, dimethyloctylamine, dimethyldecylamine, dimethyllaurylamine, dimethylstearlyamine, dilaurylmonomethylamine, trioctylamine, dimethyldidodecylammonium chloride, dimethyldioleylammonium chloride, dimethyldidecylammonium chloride, dimethyldioctylammonium chloride, trimethylstearlyammonium chloride, dimethyldistearlyammonium chloride, trimethyldecylammonium chloride, trimethylhexadecylammonium chloride, trimethyloctadecylammonium chloride, dimethyldodecyltetradecylammonium chloride, and dimethylhexadecyloctadecylammonium chloride.

When any one of $R_{10}$, $R_{11}$, $R_{12}$ and $R_{13}$ in Formula (9) denotes a polyoxyalkylene group, examples thereof include a polyoxyethylene group or a polyoxypropylene group.

The aforementioned resin type pigment dispersant has a pigment affinity moiety, which has a property to adsorb onto pigments, and a moiety which is compatible with the pigment carrier, and serves to stabilize the dispersion of the pigment into the pigment carrier by adsorption onto the pigment. Specifically, as the resin type pigment dispersant, use may be made of, for example, a polyurethane, a polycarboxylic acid ester such as a polyacrylate, an unsaturated polyamide, a polycarboxylic acid, a polyamine (partial) carboxylate, an ammonium salt of a polycarboxylic acid, a polyalkylamine carboxylate, a polysiloxane, a long chain polyaminoamide phosphate, a hydroxyl group-containing polycarboxylic acid ester, or modified forms of these polymers, an oily dispersing agent such as amide which is formed by a reaction of a poly(lower alkyleneimine) with a polyester having a free carboxyl group or a salt thereof; a water-soluble resin or water-soluble polymer such as a (meth)acrylic acid-styrene copolymer, a (meth)acrylic acid-(meth)acrylate copolymer, a styrene-maleic acid copolymer, a polyvinyl alcohol, a polyvinyl pyrrolidine; a polyester, a modified polyacrylate, an ethylene oxide/propylene oxide adduct, and phosphate ester. These materials can be employed singly or in combination of two or more kinds.

Examples of the surfactant mentioned above include an anionic surfactant such as a polyoxyethylene alkyl ether sulfate, sodium dodecylbenzenesulfonate, an alkali salt of a styrene-acrylic acid copolymer, sodium stearate, sodium alkylnaphthalenesulfonate, sodium alkyldiphenyl ether disulfonate, monoethanolamine dodecylsulfate, triethanolamine dodecyl sulfate, ammonium dodecylsulfate, monoethanolamine stearate, sodium stearate, sodium dodecylsulfate, monoethanolamine of styrene-acrylic acid copolymer, polyoxyethylene alkylether phosphate, etc.; a nonionic surfactant such as polyoxyethylene oleyl ether, polyoxyethylene dodecyl ether, polyoxyethylene nonylphenyl ether, polyoxyethylene alkylether phosphate, polyoxyethylene sorbitan monostearate, polyethyleneglycol monolaurate, etc.; a cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

The yellow-colored composition and the cyan-colored composition are added with a photopolymerization initiator if these compositions are cured by the irradiation of ultraviolet rays.

As the photo-polymerization initiator, use may be made of an acetophenone-based photopolymerization initiator such as 4-phenoxydichloroacetophenone, 4-t-butyldichloroacetophenone, diethoxyacetophenone, 1-(4-isopropylphenyl)-2-hydroxy-2-methylpropan-1-one, 1-hydroxycyclohexylphenylketone, 2-benzyl-2-dimethylamino-1-(4-morpholinophenyl)-butan-1-one, 2-methyl-1-[4-(methylthio)phenyl]-2-morpholinobutan-1-one; a benzoin-based photo-polymerization initiator such as benzoin, benzoin methyl ether, benzoin ethyl ether, benzoin isopropyl ether, benzyldimethyl ketal, etc.; a benzophenone-based photo-polymerization initiator such as benzophenone, benzoylbenzoic acid, benzoylmethyl benzoate, 4-phenylbenzophenone, hydroxybenzophenone, acrylated benzophenone, 4-benzoyl-4'-methyldiphenyl sulfide, etc.; a thioxanthone-based photo-polymerization initiator such as thioxanthone, 2-chlorothioxanthone, 2-methylthioxanthone, isopropylthioxanthone, 2,4-diisopropylthioxanthone, etc.; a triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; a borate photopolymerization initiator; a carbazole photopolymerization initiator; and an imidazole photopolymerization initiator. These photopolymerization initiators can be employed in an amount of 5 to 150 parts by weight based on 100 parts by weight in total of the pigments.

Although the aforementioned photo-polymerization initiators can be employed singly or in combination of two or more kinds, they can be employed together with a sensitizer such as α-acyloxime ester, acylphosphine oxide, methylphenyl glyoxylate, benzil, 9,10-phenanthrenequinone, camphorquinone, ethylanthraquinone, 4,4'-diethylisophthalophenone, 3,3',4,4'-tetra(t-butylperoxycarbonyl) benzophenone or 4,4'-diethylaminobenzophenone. These sensitizers can be employed in an amount of 0.1 to 150 parts by weight based on 100 parts by weight of the photo-polymerization initiator.

The colored composition of the present invention may further comprise a solvent in order to fully disperse the pigment in the pigment carrier and to coat the dispersion on the surface of substrate such as a glass substrate so as to provide a dried film thickness of 0.5 to 5 µm, thereby facilitating the formation of the filter segment. Examples of the solvent include, for example, cyclohexanone, ethylcellosolve acetate, butylcellosolve acetate, 1-methoxy-2-propyl acetate, diethyleneglycol dimethyl ether, ethylbenzene, ethyleneglycol diethyl ether, xylene, ethylcellosolve, methyl-n-amyl ketone, propyleneglycol monomethyl ether acetate, propyleneglycol monomethyl ether toluene, methylethyl ketone, ethyl acetate, methanol, ethanol, isopropyl alcohol, butanol, isobutyl ketone, and petroleum solvent. These solvents may be employed singly or in combination of two or more kinds. These solvents can be employed in an amount of 500 to 4000 parts by weight based on 100 parts by weight in total of the pigments.

The colored composition of the present invention may contain a storage-stabilizing agent in order to suppress a change with time of viscosity thereof. Examples of the storage-stabilizing agent include, for example, quaternary ammonium chloride such as benzyltrimethyl chloride, diethylhydroxyamine; an organic acid such as lactic acid, oxalic acid, or methyl ether thereof; t-butylpyrocatechol; an organic phosphine such as triethyl phosphine, triphenyl phosphine; and phosphite. These storage-stabilizing agents can be employed in an amount of 0.1 to 5 parts by weight based on 100 parts by weight in total of the pigments.

The colored composition for color filter according to the present invention can be formulated as a solvent-developing type or alkali-developing type colored resist material, as a gravure offset printing ink, as a silk screen printing ink, or as an inkjet printing ink, etc. The colored resist material is formed of a composition comprising a resin selected from the aforementioned thermoplastic resin, thermosetting resin or active energy ray-curable resin, as well as the aforementioned monomer, and the aforementioned photopolymerization initiator, in which the predetermined pigment is dispersed.

In the case where the filter segment is formed by a photolithography method, the yellow pigment, or the phthalocyanine blue pigment and the phthalocyanine green pigment is/are incorporated into the yellow-colored composition or the cyan-colored composition, each containing a solvent, in an amount of 1.5 to 12% by weight in total. Further, the yellow pigment, or the phthalocyanine blue pigment and the phthalocyanine green pigment is/are incorporated into the final filter segment, in an amount of preferably 10 to 60% by weight, more preferably 20 to 50% by weight in total, the balance being substantially constituted by a resinous binder provided by the pigment carrier.

It is preferable to remove, from the colored composition of the present invention, coarse particles having a particle diameter of 5 µm or more, preferably 1 µm or more, more preferably 0.5 µm or more and other dusts that have been mixed thereinto by means of, for example, a centrifugal separation, a sintered filter or a membrane filter.

Next, the color filter of the present invention will be explained.

The color filter of the present invention comprises a filter segment prepared from the yellow-colored composition or the cyan-colored composition of the present invention, a red-colored filter segment, a green-colored filter segment, a blue-colored filter segment, and, if required, a magenta-colored filter segment. The color filter comprising a yellow-colored filter segment and/or a magenta-colored filter segment in addition to cyan, red, green and blue-colored filter segments is preferable in that it is capable of further enlarging the color reproducing area as it is fabricated into a panel.

The color filter of the present invention can be manufactured by forming, on a transparent or a light-reflecting substrate, each of the color filter segments using each of the colored compositions by a printing method or photolithography method.

The red-colored filter segment can be formed by using an ordinary yellow-colored composition. A yellow-colored composition may be a composition obtained by using, in place of the phthalocyanine blue pigment and phthalocyanine green pigment in the cyan-colored composition of the present invention, a red pigment such as C.I. Pigment Red 7, 14, 41, 48:2, 48:3, 48:4, 81:1, 81:2, 81:3, 81:4, 146, 168, 177, 178, 184, 185, 187, 200, 202, 208, 210, 246, 254, 255, 264, 270, 272, 279, etc. The yellow-colored composition may further include an orange pigment such as C.I. Pigment Orange 43, 71, 73, etc.

The blue-colored filter segment can be formed by using an ordinary blue-colored composition. A blue-colored composition may be a composition obtained by using, in place of the phthalocyanine blue pigment and phthalocyanine green pigment in the cyan-colored composition of the present invention, a blue pigment such as C.I. Pigment Blue 15, 15:1, 15:2, 15:3, 15:4, 15:6, 16, 22, 60, 64, etc. Further, the blue-colored composition may further include a purple pigment such as C.I. Pigment Violet 1, 19, 23, 27, 29, 30, 32, 37, 40, 42, 50, etc.

The magenta-colored filter segment can be formed by using an ordinary magenta-colored composition. A magenta-colored composition may be a composition obtained by using, in place of the phthalocyanine blue pigment and phthalocyanine green pigment in the cyan-colored composition of the present invention, a pigment such as C.I. Pigment Red 81, 81:1, 81:2, 81:3, 81:4, 122, 192, 202, 207, 209, C.I. Pigment Violet 19, etc.

As the transparent substrate, use may be made of a glass plate such as quartz glass, borosilicate glass, aluminosilicate glass, or soda lime glass having silica coated on its surface; and a resin plate such as polycarbonate, polymethyl methacrylate or polyethylene terephthalate.

As the light-reflecting substrate, use may be made of a silicon substrate or the aforementioned transparent substrate having formed thereon an aluminum thin film, a silver thin film or a silver/copper/palladium alloy thin film.

The formation of each color filter segment by means of printing process is low in cost and superior in mass productivity as a manufacturing method of color filter, since the patterning can be accomplished by simply repeating the printing and drying of the colored composition that has been prepared as a printing ink of various kinds as described above. Further, due to the development of printing technique in recent years, it is now possible to realize the printing of a fine pattern which is excellent in dimensional precision and smoothness. To carry out the printing, the ink is preferably formulated such that the ink is not readily dried or solidified on a printing plate or blanket. Further, it is also important to control the fluidity of ink on the printing machine, and the viscosity can be adjusted using a dispersing agent and an extender pigment.

Where each of the color filter segments is formed by means of a photolithography method, the colored composition that has been prepared as a solvent-developing type or alkali-developing type color resist material noted above is coated on the substrate a coating method such as spray coating, spin coating, slit coating, or roll coating, so as to obtain a dried film thickness of 0.5 to 5 µm. The dried film is exposed to ultraviolet rays through a mask having a predetermined pattern and disposed in contact with or away from the dried film. Subsequently, the resultant film is dipped in, or sprayed with, a solvent or an alkaline developing solution, to remove the uncured portions, thereby forming a desired pattern. These procedures are repeated for forming the pattern of other colors, thus manufacturing a color filter. Additionally, if required, the coated film may be heated so as to promote the polymerization of the colored resist material. According to this photolithography, it is possible to manufacture a color filter which is further improved in precision as compared with that obtained by a printing method.

In performing the development, an aqueous solution of, e.g., sodium carbonate, or sodium hydroxide, or an organic alkali such as dimethylbenzylamine or triethanolamine may be used as the alkaline developing solution. Further, an anti-foaming agent or a surfactant may be added to the developing solution.

Incidentally, in order to enhance the exposure sensitivity to ultraviolet rays, after the aforementioned color resist film is coated and dried, a water-soluble or alkali-soluble resin such as, for example, polyvinyl alcohol or a water-soluble acrylic resin may be coated and dried to form a film which is capable of preventing the polymerization inhibition due to oxygen.

Although it is possible to manufacture the color filter of the present invention by an electrodeposition method, a transferring method, etc. in place of the aforementioned methods, the colored composition of the present invention can be employed in any of these methods. Incidentally, the electrodeposition method is a method in which each of the filter segments is electro-deposited on a transparent conductive film formed on the substrate, by the electrophoresis of colloid particles by taking advantage of the transparent conductive film, thereby manufacturing the color filter.

Further, the transferring method is a method in which a color filter layer is deposited in advance on the surface of a releasable transferring base sheet and then this color filter layer is transferred onto a desired substrate.

When a black matrix is formed in advance on a transparent substrate or a light-reflecting substrate prior to the formation of the filter segments, the contrast of the liquid crystal display panel can be further enhanced. As the black matrix, use may be made of an inorganic film such as chromium, a chromium/chromium oxide multilayer film or titanium nitride, or a resin film having a light-shielding agent dispersed therein, but is not limited thereto. Moreover, a thin film transistor (TFT) may be formed in advance on the transparent substrate or the light-reflecting substrate noted above, and then the filter segments are formed. When the filter segments are formed on the TFT substrate, the aperture ratio of liquid crystal display panel can be enhanced, and the brightness can be improved.

Finally, the liquid crystal display device of the present invention will be explained.

The liquid crystal display device according to the fourth aspect of the present invention comprises a color filter of the present invention and a pseudo-white LED light source (a backlight source or a frontlight source). The pseudo-white LED light source may be formed of a blue LED whose surface is coated with a phosphor filter or formed of the resin package of a blue LED in which a phosphor is incorporated, and has spectral properties such that it has a wavelength $\lambda 1$ at which the emission intensity becomes the highest, within a wavelength range of 430 nm to 485 nm, and also has a peak wavelength $\lambda 2$ of emission within a wavelength range of 530 nm to 580 nm and a ratio of an emission intensity I2 at the wavelength $\lambda 2$ to an emission intensity I1 at the wavelength $\lambda 1$, I2/I1, is 0.2 or more, but 0.7 or less. The blue LED is an LED which emits blue light (wavelength being 470 nm for instance) such as InGaN system or GaN system. The phosphor filter absorbs part of blue light from the blue LED and emits a yellow light having a maximum emission within a wavelength range of 500-600 nm. In the white LED of this system, part of blue light emitted from the blue LED is transmitted through the phosphor layer, while the rest of blue light is absorbed by the phosphor and converted into yellow light. A mixed light of the blue and yellow lights is recognized as white light by an observer. The phosphor which converts the blue light into yellow light includes YAG (yttrium aluminum garnet). The pseudo-white LED light source of this type is available from Nichia Corporation under NSPW 300BS, NSPW 310BS, NSPW 312BS, NSPW 315BS, NSPW 500BS and NEPW 500. When a pseudo-white LED light source having the aforementioned spectral properties is combined with the color filter of the present invention, it is possible to further enlarge the color reproducing area of the liquid crystal display device.

The liquid crystal display device according to the fifth aspect of the present invention comprises a color filter of the present invention and a cold cathode fluorescent tube light source (a backlight source or a frontlight source). The cold cathode fluorescent tube light source preferably has spectral properties such that it has a wavelength $\lambda 3$ at which the emission intensity becomes the local maximum, within a wavelength range of 470 nm to 530 nm, and also has a wavelength $\lambda 4$ at which the emission intensity becomes the highest, within a wavelength range of 530 nm to 580 nm, and a ratio of the emission intensity I3 at the wavelength $\lambda 3$ to the emission intensity I4 at the wavelength $\lambda 4$, I3/I4, is 0.2 or more but 0.7 or less. When a cold cathode fluorescent tube light source having the aforementioned spectral properties is employed in combination with the color filter of the present invention, it is possible to further enlarge the color reproducing area of a liquid crystal display device. The cold cathode fluorescent tube can be reproduced by F10.

The liquid crystal display device according to the sixth aspect of the present invention comprises a color filter of the present invention and a three-color (red, green and blue) LED light source (a backlight light source or a frontlight light source). The three-color LED light source may be formed of a blue LED with a phosphor filter is formed on its surface or formed of the resin package of a blue LED in which a phosphor is incorporated, and has spectral properties such that it has a wavelength $\lambda 5$ at which the emission intensity becomes the highest, within a wavelength range of 430 nm to 485 nm and also has a wavelength $\lambda 6$ at which becomes local maximum, within a wavelength range of 530 nm to 580 nm, and a ratio of the emission intensity I6 at the wavelength $\lambda 6$ to the emission intensity I5 at the wavelength $\lambda 5$, I6/I5, is 0.2 or more, but 0.7 or less. The blue LED is an LED which emits blue light (wavelength being 470 nm for instance) such as InGaN system or GaN system. The phosphor filter absorbs part of blue emission from the blue LED and emits a green light having a maximum emission within 530-580 nm and also a red light having a maximum emission within 610-670 nm. In the three-color LED of this system, part of blue light emitted from the blue LED is transmitted through the phosphor layer and the rest of blue light is absorbed by the phosphor and converted into green and red lights. The phosphor which converts the blue light into green light include a crystal of $CaGa_2S_4$:Eu. The phosphor which converts the blue light into green light includes a crystal of CaS:Eu. A mixed light consisting of the three colors of light, i.e., the blue, green and red lights, is recognized as white light by an observer. The three-color LED of this type is available from Seiwa Denki Co., Ltd. under SDPW 50B0B, SDPW 50H0B and SDPW 3DG0B. When a three-color LED light source having the aforementioned spectral properties is employed in combination with the color filter of the present invention, it is possible to further enlarge the color reproducing area of a liquid crystal display device.

The color properties of the liquid crystal display device equipped with a color filter and a light source will depend on the transmitting spectrum of the color filter and the light properties of the light source, and is determined by the wavelength distribution of the product of the spectrum intensity distribution of the light source and the transmitting spectrum of the color filter. In order to enlarge the color reproducing area as the color filter is formed into a panel, the ratio of superimposition between the transmitting spectrum of cyan color and the spectrum intensity distribution should preferably be as large as possible and, at the same time, the emission intensity should preferably be as high as possible. Therefore, the cold cathode fluorescent tube light source and the three-color LED light source both having the aforementioned spectral properties are preferable.

As required, an overcoat film, a columnar spacer, a transparent conductive film, a liquid crystal alignment film, etc. may be formed on the color filter of the present invention.

A liquid crystal display panel can be manufactured by forming the color filter on one of opposing substrates which are then bonded together with a sealing agent, pouring a liquid crystal through an inlet provided at the sealed portion, sealing the inlet, and if required, laminating a polarizer film or a retardation film on the outer surface of the substrates.

Such a liquid crystal display panel can be applied in liquid crystal display mode where the color filter is used to display color images, including twisted nematic (TN), super twisted nematic (STN), in-plane switching (IPS), vertical alignment (VA), of optically compensated bend (OCB) mode.

Figure 1:
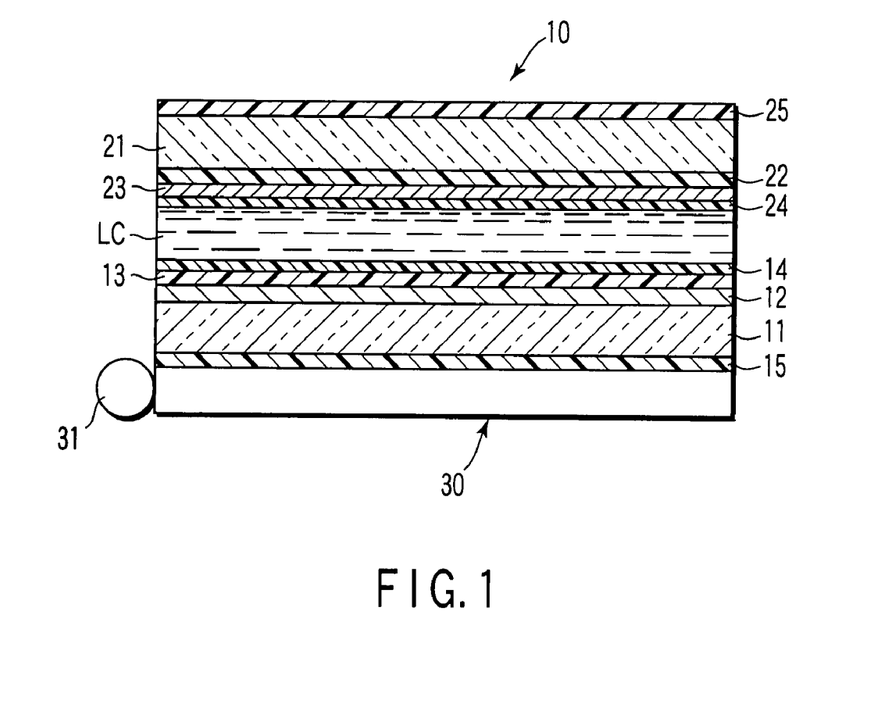
FIG. 1 is a schematic cross-sectional view of a color liquid crystal display device to which a color filter according to the present invention is applicable.

FIG. 1 is a schematic cross-sectional view illustrating a color liquid crystal display device 10 equipped with a backlight unit, to which the color filter of the invention can be applied. The color liquid crystal display device 10 illustrated in FIG. 1 represents a typical example of a TFT-driven liquid crystal display device for use in a notebook type personal computer and is provided with a pair of transparent substrates 11 and 21, which are disposed to face each other and spaced apart from each other, between which substrates a liquid crystal composition (for example, TN or STN liquid crystal composition) LC is sealed. On the inner surface of the first transparent substrate 11, there is formed a TFT (thin film transistor) array 12, on which a transparent electrode layer 13 made of, e.g., ITO is formed. An alignment layer 14 is disposed on the transparent electrode layer 13. Further, a polarizer 15 is disposed on the outer surface of the transparent substrate 11.

On the other hand, on the inner surface of the second transparent substrate 21, there is formed a color filter 22 of the present invention. The red, green, blue, yellow, cyan and magenta color filter segments constituting the color filter 22 are respectively separated by a black matrix (not shown). A transparent electrode layer 23 made of, e.g., ITO is disposed to cover the color filter 22, and an alignment layer 24 is further provided to cover the transparent electrode layer 23. Additionally, another polarizer 25 is disposed on the outer surface of the transparent substrate 21.

A backlight unit 30 equipped with a light source (a pseudo-white LED light source, a cold cathode fluorescent tube light source or a three-color LED light source) 31 is provided outside the first transparent substrate 11 and in close contact with the polarizer 15.

Figure 2:
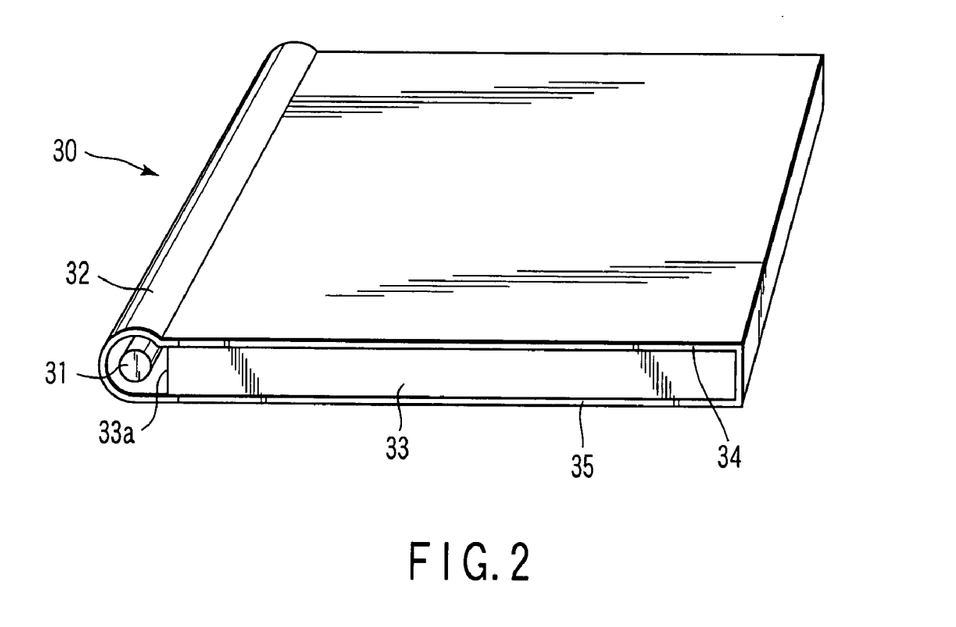
FIG. 2 is a perspective view illustrating a backlight unit employed in the color liquid crystal display device illustrated in FIG. 1.

FIG. 2 is a perspective view of the backlight unit 30 illustrated in FIG. 1. The backlight unit 30 comprises the light source 31, a light-guiding plate 33 and a diffuser plate 34, which is mounted on the upper surface of the light-guiding plate 33. The light source 31 is disposed to face one side face 33a of the light-guiding plate 33 and is entirely covered over its length by the reflector 32 except for the portion corresponding to the side face 33a of the light-guiding plate 33. Further, the other three side faces other than the side face 33a and bottom surface of the light-guiding plate 33 are covered by a reflecting plate 35. The light from the light source 31 is conducted by the reflector 32 to the light-guiding plate 33 and passes through the diffuser plate 34 to become area light, which enters the liquid crystal layer LC from the polarizer 15. The reflecting plate 35 efficiently directs the light entering the light-guiding plate 33 toward the diffuser plate 34.

A liquid crystal display device which comprises, as a backlight source, the pseudo-white LED light source, the cold cathode fluorescent tube light source or the three-color LED light source has been described with reference to FIG. 1, but needless to say, the present invention is also applicable to a liquid crystal display device which comprises, as a frontlight source, the pseudo-white LED light source, the cold cathode fluorescent tube light source or the three-color LED light source.

The present invention will be explained below by way of Examples. Note that "parts" and "%" in Examples represent "weight parts" and "% by weight", respectively.

<Preparation of Acrylic Resin Solution 1>

800 parts of cyclohexanone was put into a reaction vessel constituted by a separable 4-neck flask equipped with a thermometer, a condenser tube, a nitrogen gas-introducing tube and a stirrer, and heated to 100° C. while introducing nitrogen gas into the reaction vessel. At that temperature, a mixture of 60.0 parts of styrene, 60.0 parts of methacrylic acid, 65.0 parts of methyl methacrylate, 65.0 parts of butyl methacrylate and 10.0 parts of azobisisobutyronitrile was added dropwise through a dropping tube over one hour to effect a polymerization reaction.

After finishing the dropwise addition, the reaction was further continued for three hours at 100° C. Then, 2.0 parts of azobisisobutyronitrile dissolved in 50 parts of cyclohexanone was added and the reaction was further continued for one hour at 100° C., affording a solution of an acrylic resin having a weight average molecular weight of about 40000 (as measured by GPC).

After cooled to room temperature, about 2 g of the acrylic resin solution was sampled and heat-dried for 20 minutes at 180° C. and non-volatiles were measured. Based on the value of the measurement, cyclohexanone was added to the resin solution synthesized previously in such an amount that the content of the non-volatiles became 20%, thus preparing an acrylic resin solution 1.

<Preparation of Acrylic Resin Solution 2>

700 parts of cyclohexanone was poured into the same reaction vessel as employed in the preparation of the acrylic resin solution 1 and heated up to 80° C. Then, the inside of the reaction vessel was substituted by nitrogen gas, and a mixture of 133 parts of n-butyl methacrylate, 46 parts of 2-hydroxyethyl methacrylate, 43 parts of methacrylic acid, 74 parts of para-cumylphenol ethylene oxide-modified acrylate (Alonix M110 from Toagosei Co., Ltd.), and 4.0 parts of 2,2'-azobisisobutyronitrile was added dropwise through the dropping tube over two hours to effect polymerization reaction.

After finishing the dropwise addition, the reaction was continued for three hours to afford a solution of acrylic resin having a weight average molecular weight of about 26000 (as measured by GPC).

After the solution was cooled down to room temperature, about 2 g of the resin solution was sampled and heated to dry at 180° C. for 20 minutes, and the nonvolatiles were measured. Based on this measured value, cyclohexanone was added to the resin solution synthesized previously in such an amount that the content of the non-volatiles became 20%, thus preparing an acrylic resin solution 2.

<Preparation of Treated Yellow Pigment 1>

500 parts of isoindolinone-based yellow pigment (C.I. Pigment Yellow 139, "IRGAPHOR YELLOW 2R-CF" available from Chiba Specialty Chemicals Co., Ltd.), 500 parts of sodium chloride and 250 parts of diethylene glycol were charged in a one-gallon stainless kneader (Inoue Seisakusho Co., Ltd.) and kneaded for 8 hours at 120° C. Then, the kneaded material was charged in 5 liters of hot water and was stirred for one hour while heating to 70° C. to afford a slurry. Then, the slurry was repeatedly filtered and washed with water to remove the sodium chloride and diethylene glycol. The resultant material was then dried overnight at 80° C. to afford 490 parts of treated yellow pigment 1.

<Preparation of Treated Yellow Pigment 2>

500 parts of isoindolinone-based yellow pigment (C.I. Pigment Yellow 139, "IRGAPHOR YELLOW 2R-CF" available from Chiba Specialty Chemicals Co., Ltd.), 500 parts of sodium chloride and 250 parts of diethylene glycol were charged in a one-gallon stainless kneader (Inoue Seisakusho Co., Ltd.) and kneaded for two hours at 120° C. Then, the kneaded material was charged in 5 liters of hot water and stirred for one hour while heating to 70° C. to afford a slurry. Then, the slurry was repeatedly filtered and washed with water to remove the sodium chloride and diethylene glycol. The resultant material was then dried overnight at 80° C. to afford 490 parts of the treated yellow pigment 2.

<Preparation of Treated Yellow Pigment 3>

500 parts of isoindoline-based yellow pigment (C.I. Pigment Yellow 185, "PALIOTOL YELLOW D1155" available from BASF Co., Ltd.), 500 parts of sodium chloride and 250 parts of diethylene glycol were charged in a one-gallon stainless kneader (Inoue Seisakusho Co., Ltd.) and kneaded for 8 hours at 120° C. Then, the kneaded material was charged in 5 liters of hot water and stirred for one hour while heating to 70° C. to afford a slurry. Then, the slurry was repeatedly filtered and washed with water to remove the sodium chloride and diethylene glycol. The resultant material was then dried overnight at 80° C. to afford 490 parts of treated yellow pigment 3.

<Preparation of Treated Yellow Pigment 4>

500 parts of isoindoline-based yellow pigment (C.I. Pigment Yellow 185, "PALIOTOL YELLOW D1155" available from BASF Co., Ltd.), 500 parts of sodium chloride and 250 parts of diethylene glycol were charged in a one-gallon stainless kneader (Inoue Seisakusho Co., Ltd.) and kneaded for two hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to afford 490 parts of treated yellow pigment 4.

<Preparation of Treated Yellow Pigment 5>

500 parts of metal complex-based yellow pigment (C.I. Pigment Yellow 150, "E-4GN" available from Lanxess Co., Ltd.), 500 parts of sodium chloride and 250 parts of diethylene glycol were charged in a one-gallon stainless kneader (Inoue Seisakusho Co., Ltd.) and kneaded for 8 hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to afford 490 parts of treated yellow pigment 5.

Toyo Ink Mfg. Co., Ltd.), 600 parts of sodium chloride and 600 parts of diethylene glycol were charged in a one-gallon stainless kneader (Inoue Seisakusho Co., Ltd.) and kneaded for 8 hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to afford treated blue pigment 1 (see Table 1 below).

<Preparation of Treated Blue Pigments 2-5>

200 parts of the pigment shown in Table 1, and sodium chloride and diethylene glycol in an amount indicated in Table 1 were charged in a one-gallon stainless kneader (Inoue Seisakusho Co., Ltd.) and kneaded for time period and at a temperature, indicated in Table 1. Then, the sodium chloride and diethylene glycol were removed as in the preparation of treated blue pigment 1, thereby affording treated blue pigments 2-5.

TABLE 1

| | Pigment used | Color Index No. | Sodium chloride | Diethylene glycol | Kneading temp. | Kneading time |
|---|---|---|---|---|---|---|
| Treated blue pigment 1 | Lionol Blue FG-7351 | C.I. Pigment Blue 15:3 | 600 parts | 600 parts | 120° C. | 8 hours |
| Treated blue pigment 2 | Lionol Blue FG-7351 | C.I. Pigment Blue 15:3 | 1200 parts | 1200 parts | 120° C. | 8 hours |
| Treated blue pigment 3 | Lionol Blue FG-7351 | C.I. Pigment Blue 15:3 | 1500 parts | 1500 parts | 100° C. | 7 hours |
| Treated blue pigment 4 | Lionol Blue FG-7400 G | C.I. Pigment Blue 15:4 | 600 parts | 600 parts | 120° C. | 8 hours |
| Treated blue pigment 5 | Lionol Blue FG-7400 G | C.I. Pigment Blue 15:4 | 1500 parts | 1500 parts | 120° C. | 8 hours |

<Preparation of Treated Yellow Pigment 6>

500 parts of quinophthalone-based yellow pigment (C.I. Pigment Yellow 138, "PALIOTOL YELLOW K0960-HD" available from BASF Co., Ltd.), 500 parts of sodium chloride and 250 parts of diethylene glycol were charged in a one-gallon stainless kneader (Inoue Seisakusho Co., Ltd.) and kneaded for two hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to afford 490 parts of treated yellow pigment 6.

<Preparation of Treated Yellow Pigment 7>

500 parts of anthraquinone-based yellow pigment (C.I. Pigment Yellow 199, "CHROMOPHTHAL YELLOW GT-A0" available from Chiba Specialty Chemicals Co., Ltd.), 500 parts of sodium chloride and 250 parts of diethylene glycol were charted in a one-gallon stainless kneader (Inoue Seisakusho Co., Ltd.) and kneaded for two hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to afford 490 parts of treated yellow pigment 7.

<Preparation of Treated Blue Pigment 1>

200 parts of phthalocyanine-based blue pigment C.I. Pigment Blue 15:3 ("LIONOL BLUE FG-7351" available from <Preparation of Treated Green Pigment 1>

200 parts of phthalocyanine-based green pigment C.I. Pigment Green 7 ("LIONOL GREEN Y-101" available from Toyo Ink Mfg. Co., Ltd.), 600 parts of sodium chloride and 600 parts of diethylene glycol were charged in a one-gallon stainless kneader (Inoue Seisakusho Co., Ltd.) and kneaded for 8 hours at 120° C. Then, the kneaded material was charged in 5 liters of hot water and stirred for one hour while heating to 70° C. to give a slurry. Then, the slurry was repeatedly filtered and washed with water to remove the sodium chloride and diethylene glycol. The resultant material was then dried overnight at 80° C. to obtain afford treated green pigment 1.

<Preparation of Treated Green Pigment 2>

Treated green pigment 2 was obtained in the same manner as in the preparation of treated green pigment 1 except that the amount of sodium chloride used was changed to 1200 parts and the amount of diethylene glycol used was changed to 1200 parts.

<Preparation of Pigment Dispersions>

130 parts of a mixture of a pigment, one of pigment derivatives 1-9 and acrylic resin solution shown in Table 2, and 120 parts of propylene glycol monomethyl ether acetate (referred to hereinafter as PGMEA) were homogeneously stirred and mixed, and dispersed for 3 hours by means of Igar Mill ("Minimodel M-250 $MK_{II}$" available from Igar Japan Co., Ltd.) using zirconia beads having a diameter of 1.0 mm. The resultant material was filtered using a 5-μm filter to prepare a pigment dispersion.

The structures of the pigment derivatives 1-9 are shown below.

Pigment derivative 1:

Cu-pc: Copper phthalocyanine residue

Pigment derivative 2:

Cu-pc: Copper phthalocyanine residue

Pigment derivative 3:

Cu-pc: Copper phthalocyanine residue

Pigment derivative 4:

Pigment derivative 5:

Pigment derivative 6:

-continued

Pigment derivative 7:

Pigment derivative 8:

Pigment derivative 9:

TABLE 2

| Pigment dispersion | Pigment Kind | Amount (parts) | Pigment derivative Kind | Amount (parts) | Acrylic resin solution kind | Amount (parts) | PGMEA Amount (parts) |
|---|---|---|---|---|---|---|---|
| 1 | Lionel Blue FG-7351, untreated | 27.5 | 1 | 2.5 | 1 | 100 | 120 |
| 2 | Treated blue pigment 1 | 27 | 1 | 3 | 1 | 100 | 120 |
| 3 | Treated blue pigment 1 | 27 | 2 | 3 | 2 | 100 | 120 |
| 4 | Treated blue pigment 2 | 27 | 2 | 3 | 1 | 100 | 120 |
| 5 | Treated blue pigment 3 | 27 | 3 | 3 | 2 | 100 | 120 |
| 6 | Treated blue pigment 4 | 27 | 1 | 3 | 1 | 100 | 120 |
| 7 | Treated blue pigment 5 | 27 | 1 | 3 | 2 | 100 | 120 |
| 8 | Lionol Blue ES *1 | 27 | 1 | 3 | 1 | 100 | 120 |
| 9 | Lionol Grean Y-101, untreated | 27 | 3 | 3 | 1 | 100 | 120 |
| 10 | Treated green pigment 1 | 27 | 3 | 3 | 2 | 100 | 120 |
| 11 | Treated green pigment 2 | 27 | 3 | 3 | 2 | 100 | 120 |
| 12 | CROMOPHTAL RED A2B *2 | 27 | 4 | 3 | 2 | 100 | 120 |
| 13 | PALIOTOL YELLOW D1819 *3 | 27 | 5 | 3 | 2 | 100 | 120 |
| 14 | Lionol Grean 6YK *4 | 27 | 6 | 3 | 2 | 100 | 120 |
| 15 | E-4GN-GT *5 | 27 | 7 | 3 | 2 | 100 | 120 |
| 16 | LIONOL BLUE ES *1 | 27 | 1 | 3 | 2 | 100 | 120 |
| 17 | Fast Violet RL *6 | 27 | 8 | 3 | 2 | 100 | 120 |
| 18 | FANAL ROSE D4830 *7 | | | | | | |
| 19 | Treated yellow pigment 1 | 27 | 9 | 3 | 1 | 100 | 120 |
| 20 | Treated yellow pigment 2 | 27 | 9 | 3 | 1 | 100 | 120 |
| 21 | Treated yellow pigment 3 | 27 | 9 | 3 | 1 | 100 | 120 |
| 22 | Treated yellow pigment 4 | 27 | 9 | 3 | 1 | 100 | 120 |
| 23 | Treated yellow pigment 5 | 27 | 9 | 3 | 1 | 100 | 120 |
| 24 | Treated yellow pigment 6 | 27 | 6 | 3 | 1 | 100 | 120 |

TABLE 2-continued

| Pigment dispersion | Pigment Kind | Amount (parts) | Pigment derivative Kind | Amount (parts) | Acrylic resin solution kind | Amount (parts) | PGMEA Amount (parts) |
|---|---|---|---|---|---|---|---|
| 25 | Treated yellow pigment 7 | 27 | 9 | 3 | 1 | 100 | 120 |
| 26 | Treated yellow pigment 1 | 27 | 9 | 3 | 2 | 100 | 120 |

*1 Phthalocyanine-based blue pigment available from Toyo Ink Mfg. Co., Ltd. (C.I. Pigment Blue 15:6)
*2 Anthraquinone-based red pigment available from Chiba Specialty Chemicals Co., Ltd. (C.I. Pigment Red 177)
*3 Isoindolinone-based yellow pigment available from BASF Co., Ltd. (C.I. Pigment Yellow 139)
*4 Phthalocyanine-based green pigment available from Toyo Ink Mfg. Co., Ltd. (C.I. Pigment Green 36)
*5 Metal complex-based yellow pigment available from Lanxess Co., Ltd. (C.I. Pigment Yellow 150)
*6 Dioxazine-based violet pigment available from Clariant Co., Ltd. (C.I. Pigment Violet 23)
*7 Dye laked pigment available from Clariant Co., Ltd. (C.I. Pigment Red 81:2)

<Preparation of Colored Compositions>

EXAMPLE 1

A mixture having the composition shown below was homogeneously stirred and mixed, and then filtered using a 1 μm-filter to prepare an alkali-developing type cyan-colored composition 1.

| | |
|---|---|
| Pigment dispersion 1 shown in Table 2: | 12.0 parts |
| Pigment dispersion 9 shown in Table 2: | 48.0 parts |
| Photopolymerization initiator ("IRGACURE 907" available from Chiba Specialty Chemicals Co., Ltd.): | 2.0 parts |
| Trimethylolpropane triacrylate ("NK Ester ATMPT" available from Shin Nakamura Kagaku Co., Ltd.) | 5.0 parts |
| Sensitizer ("EAB-F" available from Hodogaya Kagaku Co., Ltd.): | 0.5 part |
| Acrylic resin solution 1: | 2.5 parts |
| Cyclohexanone: | 30.0 parts |

EXAMPLES 2-20 AND COMPARATIVE EXAMPLES 1-3

Cyan- or yellow-colored compositions 2-20 were prepared in the same manner as in Example 1 except that the pigment dispersions shown in Table 3 were employed.

<Preparation of Magenta, Red, Green and Blue-Colored Compositions>

The colored compositions 16-19 were prepared in the same manner as in Example 1 except that the pigment dispersions shown in Table 3 were employed.

TABLE 3

| | Colored Comp. | Pigment dispersion Kind | Amount (parts) | Pigment dispersion Kind | Amount (parts) | Hue of colored comp. x | y | Y | Contrast ratio | Light fastness |
|---|---|---|---|---|---|---|---|---|---|---|
| Example 1 | 1 | 1 | 12 | 9 | 48 | 0.131 | 0.222 | 12.8 | 1600 | 2.7 |
| Example 2 | 2 | 2 | 12 | 9 | 48 | 0.131 | 0.222 | 12.9 | 2000 | 2.9 |
| Example 3 | 3 | 4 | 12 | 9 | 48 | 0.131 | 0.222 | 12.9 | 2500 | 2.5 |
| Example 4 | 4 | 6 | 12 | 9 | 48 | 0.131 | 0.222 | 13.0 | 2500 | 2.6 |
| Comp. Example 1 | 5 | 8 | 12 | 9 | 48 | 0.144 | 0.102 | 15.9 | 1000 | 4.6 |
| Example 5 | 6 | 3 | 12 | 10 | 48 | 0.131 | 0.222 | 13.0 | 2700 | 2.9 |
| Example 6 | 7 | 5 | 12 | 10 | 48 | 0.131 | 0.222 | 13.0 | 3000 | 2.5 |
| Example 7 | 8 | 7 | 12 | 10 | 48 | 0.131 | 0.222 | 13.0 | 3000 | 2.6 |
| Example 8 | 9 | 7 | 12 | 11 | 48 | 0.131 | 0.222 | 13.2 | 4000 | 2.6 |
| Example 9 | 10 | 5 | 20 | 11 | 30 | 0.134 | 0.172 | 12.9 | 4200 | 2.2 |
| Comp. Example 2 | 11 | 8 | 30 | 11 | 30 | 0.141 | 0.164 | 16.2 | 1200 | 4.4 |
| Example 10 | 12 | 7 | 48 | 11 | 12 | 0.137 | 0.122 | 13.0 | 5000 | 1.5 |
| Comp. Example 3 | 13 | 8 | 48 | 11 | 12 | 0.142 | 0.089 | 12.7 | 1400 | 4.1 |
| Example 11 | 14 | 13 | 48 | 15 | 12 | 0.463 | 0.508 | 80.1 | 3000 | 1.5 |
| Example 12 | 15 | 13 | 30 | 15 | 30 | 0.463 | 0.508 | 80.1 | 6000 | 1.0 |
| Magenta colored comp. | 16 | 18 | 60 | — | — | | | | | |
| Red colored comp. | 17 | 12 | 50 | 13 | 10 | | | | | |
| Green colored comp. | 18 | 14 | 39 | 15 | 21 | | | | | |
| Blue colored comp. | 19 | 16 | 51 | 17 | 9 | | | | | |
| Example 13 | 20 | 19 | 60 | — | — | 0.463 | 0.508 | 79.9 | 2000 | 1.9 |
| Example 14 | 21 | 20 | 60 | — | — | 0.463 | 0.508 | 79.9 | 1500 | 1.9 |
| Example 15 | 22 | 21 | 60 | — | — | 0.453 | 0.514 | 82.8 | 1800 | 1.5 |
| Example 16 | 23 | 22 | 60 | — | — | 0.453 | 0.514 | 82.8 | 1400 | 1.1 |
| Example 17 | 24 | 23 | 60 | — | — | 0.425 | 0.500 | 92.2 | 6000 | 1.0 |
| Example 18 | 25 | 24 | 60 | — | — | 0.417 | 0.495 | 94.1 | 4000 | 1.3 |
| Example 19 | 26 | 25 | 60 | — | — | 0.418 | 0.475 | 88.4 | 3000 | 1.3 |
| Example 20 | 27 | 26 | 60 | — | — | 0.463 | 0.508 | 79.9 | 2000 | 1.9 |

<Manufacture of Colored Composition-coated Substrates>

Each of the colored compositions thus obtained was spin-coated on the surface of a substrate having a size of 100 mm×100 mm and having a thickness of 0.7 mm so as to form a film having an average dried film thickness of 4 μm and then dried for 20 minutes at 70° C. Thereafter, the substrate was exposed to ultra-violet rays at a cumulative quantity of light of 300 mJ/cm² using an ultra-high pressure mercury lamp. Subsequently, the coated substrate was heated for 40 minutes at 230° C. to provide a substrate coated with each of the colored compositions.

<Measurement of Hue (x, y, Y) of Colored Coated Substrates>

Using a microspectrophotometer (OSP-SP100 available from Olympus), the hue of the coated substrates obtained was measured. The results are shown in Table 3.

<Assessment of Contrast Ratio>

Figure 3:
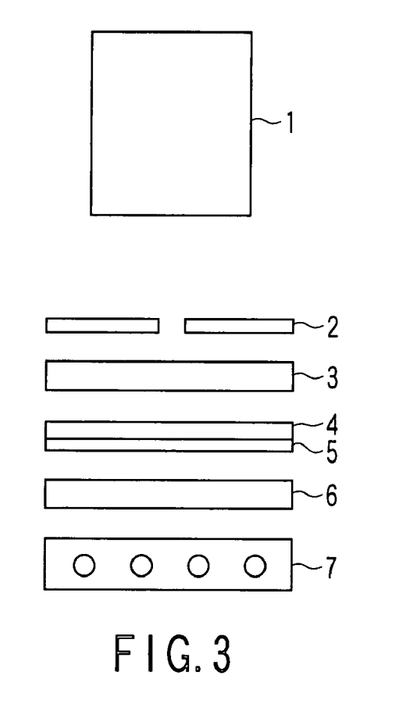
FIG. 3 is a schematic diagram illustrating an apparatus for measuring contrast ratios.

Using a measuring instrument shown in FIG. 3, the contrast of the colored composition-coated substrates was measured according to the following method.

A glass substrate 5 having a dried color composition-coated film 4 is sandwiched between two polarizers 3 and 6. Then, using a backlight unit 7 for a liquid crystal display device, light is irradiated from the side of one polarizer 6. The light emitted from the backlight unit passes through the first polarizer 6 and is polarized, which then passes through the color composition coating film 4 and the glass substrate 5 and reaches the second polarizer 3. If the polarization axes of the first polarizer 6 and the second polarizer 3 are parallel with each other, the light is permitted to pass through the second polarizer 3. On the other hand, when the polarization axes of both of the polarizers are orthogonal with each other, the light is interrupted by the second polarizer 3. However, if the light polarized by the first polarizer 6 gives rise to scattering due to the pigment particles to cause a part of the plane of polarization to shift when the light passes through the color composition-coated substrate, then an amount of light passing through the polarizer 3 is decreased when the polarization axes of both of the polarizers are parallel, and a part of the light passes through the polarizer 3 when the polarization axes of both of the polarizers are orthogonal. The brightness of this transmitted light was measured with a luminance meter 1 on the polarizer 3, and a contrast ratio is defined as a ratio of brightness when the polarization axes of both polarizers are parallel (brightness at parallel) to brightness when the polarization axes of both polarizers are orthogonal (brightness at orthogonal). That is, the contrast ratio is calculated by the following equation:

Contrast ratio=(brightness at parallel)/(brightness at orthogonal)

Therefore, when the scattering occurs due to the pigments in the colored composition coating film, the brightness at parallel decreases and the brightness at orthogonal increases, with the result that the contrast ratio lowers.

Incidentally, as the luminance meter, "Luminance Colorimeter BM-5A" available from Topcon was used, and as the polarizer, "Polarizer Film $LLC_{2-92}$-18 available from Sanritsu Co. was used. In the measurement, in order to interrupt unnecessary light, a black mask 2 having a hole of 1 cm square was applied to a part to be measured.

<Assessment of Light Fastness>

Using a light fastness evaluation apparatus ("Suntest CPS+" available from Toyo Seiki Co., Ltd.), the colored composition-coated substrates were exposed to light for 500 hours and a color difference ΔE before and after the assessment of light fastness was measured.

EXAMPLES 11-24 AND COMPARATIVE EXAMPLES 4-6

<Preparation of Color Filter>

A black matrix was formed by patterning on a glass substrate, and on the substrate, the colored composition 17 was coated with a spin coater to form a film of the colored composition. Then, using an ultra-high pressure mercury lamp, ultraviolet rays of 300 mJ/cm² were irradiated through a photomask onto the film. Subsequently, the film was spray-developed with an alkaline developing solution consisting of a 2 wt % sodium carbonate aqueous solution to remove the unexposed portions and then washed with ion-exchange water. The resultant substrate was heated at 230° C. for 20 minutes, thereby forming a red-colored filter segment having a film thickness of 2.5 μm. By the same procedures and using the colored compositions 18 and 19, a green-colored filter segment and a blue-colored filter segment, each having a film thickness of 2.5 μm, were formed. Further, by the same procedures and using the colored compositions 1-27 shown in Table 5, a cyan-colored filter segment, a yellow-colored filter segment and a magenta-colored filter segment, each having a film thickness of 2.5 μm, were formed to manufacture a color filter.

<Assessment of Color Reproducing Area>

With respect to the color filters prepared using the aforementioned colored compositions, a NTSC ratio of the color filter (ratio of an area to the standard triangular area depicted by the standard three primary RGB colors, i.e., red (0.67, 0.33), green (0.21, 0.71) and blue (0.14, 0.08), as defined by U.S. National Television System Committee (NTSC)) was measured with the standard triangular area being set at 100, when the color filter was irradiated with the light from a pseudo-white LED light source (NSPW 300BS available from Nichia Corporation) (the wavelength (λ1) at which the emission intensity becomes local maximum within a wavelength range of 430 nm to 485 nm; the emission intensity (I1); the wavelength (2) at which the emission intensity becomes the highest within a wavelength range of 530 nm to 580 nm; and the emission intensity (I2) are shown in Table 4A), or the light from a cold cathode fluorescent tube light source (F10 light source) (the wavelength (λ3) at which the emission intensity becomes local maximum within a wavelength range of 470 nm to 530 nm; the emission intensity (I2); the wavelength (λ4) at which the emission intensity becomes the highest within a wavelength range of 530 nm to 580 nm; and the emission intensity (I4) are shown in Table 4A); or the light from a three-color LED light source (SDPW 50B0B, Seiwa Denki Co., Ltd.) (the wavelength (λ5) at which the emission intensity becomes the highest within a wavelength range of 430 nm to 485 nm; the emission intensity (I5); the wavelength (λ6) at which the emission intensity becomes local maximum within a wavelength range of 530 nm to 580 nm; and the emission intensity (I6) are shown in Table 4B). The results of this assessment are shown in Table 5.

Figure 4:
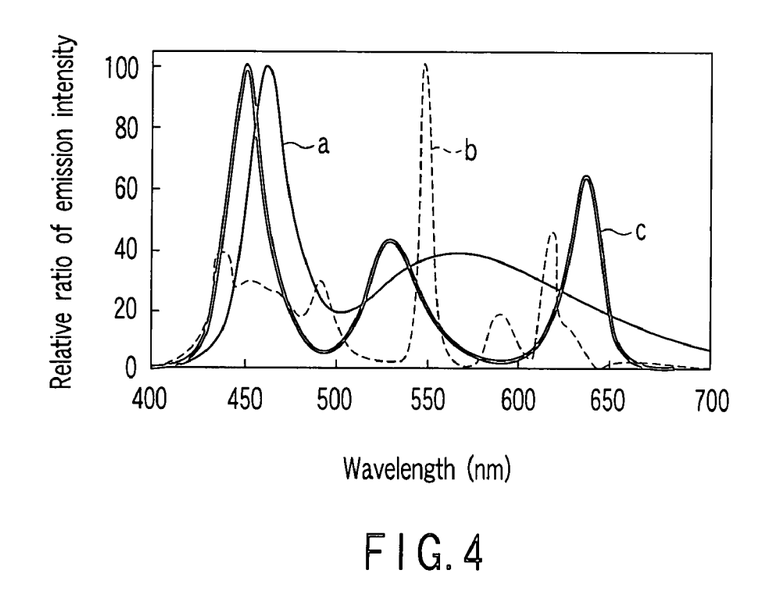
FIG. 4 is a graph illustrating the emission spectra of a pseudo-white LED light source, a cold-cathode fluorescent tube light source and a three-color LED light source.

Incidentally, the emission spectra of the pseudo-white LED light source, the cold cathode fluorescent tube light source and the three-color LED light source used are shown in FIG. 4. In FIG. 4, the curve "a" denotes the emission spectrum of the pseudo-white LED light source, the curve "b" denotes the emission spectrum of the cold cathode fluorescent tube light source and the curve "c" denotes the emission spectrum of the three-color LED light source.

TABLE 4A

| | Pseudo-white LED light source | | | | Cold cathode fluorescent tube light source | | | |
|---|---|---|---|---|---|---|---|---|
| | λ1 | λ2 | I1 | I2 | λ3 | λ4 | I3 | I4 |
| Wavelength and relative value of intensity of emission | 460 nm | 565 nm | 100 | 38 | 490 nm | 545 nm | 28.2 | 100 |

TABLE 4B

| | Three-color LED light source | | | |
|---|---|---|---|---|
| | λ5 | λ6 | I5 | I6 |
| Wavelength and relative value of intensity of emission | 465 nm | 530 nm | 100 | 42.7 |

TABLE 5

| | Light source *1 | Colored composition for forming filter segments | | | | | | Color reproduction area *1 |
|---|---|---|---|---|---|---|---|---|
| | | Red pixel | Green pixel | Blue pixel | Cyan pixel | Yellow pixel | Magenta pixel | |
| Ex. 21 | 1 | 17 | 18 | 19 | 1 | — | — | 97% |
| Ex. 22 | 1 | 17 | 18 | 19 | 2 | — | — | 97% |
| Ex. 23 | 1 | 17 | 18 | 19 | 3 | — | — | 97% |
| Ex. 24 | 1 | 17 | 18 | 19 | 4 | — | — | 97% |
| Comp. Ex. 4 | 1 | 17 | 18 | 19 | 5 | — | — | 97% |
| Ex. 25 | 1 | 17 | 18 | 19 | 6 | — | — | 97% |
| Ex. 26 | 1 | 17 | 18 | 19 | 7 | — | — | 97% |
| Ex. 27 | 1 | 17 | 18 | 19 | 8 | — | — | 97% |
| Ex. 28 | 1 | 17 | 18 | 19 | 9 | — | — | 97% |
| Ex. 29 | 1 | 17 | 18 | 19 | 10 | — | — | 94% |
| Comp. Ex. 5 | 1 | 17 | 18 | 19 | 11 | — | — | 92% |
| Ex. 30 | 1 | 17 | 18 | 19 | 12 | — | — | 93% |
| Comp. Ex. 6 | 1 | 17 | 18 | 19 | 13 | — | — | 89% |
| Ex. 31 | 1 | 17 | 18 | 19 | 10 | 14 | — | 100% |
| Ex. 32 | 1 | 17 | 18 | 19 | 10 | 15 | — | 99% |
| Ex. 33 | 1 | 17 | 18 | 19 | 10 | 15 | — | 124% |
| Ex. 34 | 2 | 17 | 18 | 19 | 10 | 15 | — | 97% |
| Ex. 35 | 3 | 17 | 18 | 19 | 10 | — | 16 | 102% |
| Ex. 36 | 1 | 17 | 18 | 19 | 10 | — | 16 | 122% |
| Ex. 37 | 2 | 17 | 18 | 19 | 10 | 14 | 16 | 108% |
| Ex. 38 | 1 | 17 | 18 | 19 | 10 | 14 | 16 | 125% |
| Ex. 39 | 2 | 17 | 18 | 19 | — | 20 | — | 95% |
| Ex. 40 | 3 | 17 | 18 | 19 | — | 21 | — | 95% |
| Ex. 41 | 3 | 17 | 18 | 19 | — | 21 | — | 100% |
| Ex. 42 | 1 | 17 | 18 | 19 | — | 21 | — | 100% |
| Ex. 43 | 2 | 17 | 18 | 19 | — | 22 | — | 95% |
| Ex. 44 | 3 | 17 | 18 | 19 | — | 23 | — | 95% |
| Ex. 45 | 3 | 17 | 18 | 19 | — | 24 | — | 94% |
| Ex. 46 | 3 | 17 | 18 | 19 | — | 25 | — | 93% |
| Ex. 47 | 3 | 17 | 18 | 19 | — | 26 | — | 93% |
| Ex. 48 | 3 | 17 | 18 | 19 | — | 27 | — | 95% |
| Comp. Ex. 7 | 3 | 17 | 18 | 19 | — | — | — | 89% |

*1 1: Cold cathode fluorescent tube light source 2: Three-color LED light source 3: Pseudo-white LED light source The results in Table 5 shows that the color filter having a yellow-colored filter segment formed from a yellow-colored composition, and a cyan-colored filter segment created from a cyan-colored composition containing Pigment Blue 15:3 or 15:4 and Pigment Green 7 is high in contrast ratio, excellent in light fastness and wide in color reproducing area, thus enabling it to exhibit excellent performance as a liquid crystal display device.

As described above, the color filter comprising a filter segment formed from the colored composition of the present invention, a red-colored filter segment, a green-colored filter segment, and a blue-colored filter segment is wide in the color reproducing area of the panel and excellent in light fastness.

Further, the color filter of the present invention comprising a red-colored filter segment, a green-colored filter segment, a blue-colored filter segment and a yellow-colored filter segment, wherein the yellow-colored filter segment is formed from a yellow-colored composition comprising a yellow pigment, a pigment dispersant, and a pigment carrier formed of a transparent resin, a precursor or a mixture thereof is excellent in light fastness.

What is claimed is:

1. A liquid crystal display device, comprising:
a color filter having
a red-colored filter segment;
a green-colored filter segment;
a blue-colored filter segment; and
a yellow-colored filter segment, wherein the yellow-colored filter segment is formed by using a yellow-colored composition including a yellow pigment, a pigment dispersant, and a pigment carrier consisting of a transparent resin, a precursor of the resin or a mixture thereof, wherein the transparent resin includes a copolymer of a first compound represented by wherein $R_{14}$ denotes a hydrogen atom or a methyl group, $R_{15}$ denotes an alkylene group, $R_{16}$ denotes a hydrogen atom or an alkyl group having 1 to 20 carbon atoms, which may contain a substituent, and m is an integer of 1 to 15, and a second compound having an ethylenically unsaturated double bond; and a pseudo-white LED light source formed of a blue LED whose surface is coated with a phosphor, wherein the pseudo-white LED light source has spectral properties such that an emission intensity becomes maximum, I1, at a wavelength λ1, which is within a wavelength range of 430 nm to 485 nm, and the emission intensity has a peak, I2, at a wavelength λ2, which is within a wavelength range of 530 nm to 580 nm, and a ratio of I2/I1 is between 0.2 and 0.7.

2. The liquid crystal display device according to claim 1, wherein the copolymer contains the first compound in an amount of 0.1 to 50% by weight.

3. The liquid crystal display device according to claim 1, wherein the second compound is selected from the group consisting of (meth)acrylic acid, methyl (meth)acrylate, (iso)propyl (meth)acrylate, (iso)butyl (meth)acrylate, (iso)pentyl (meth)acrylate, 2-hydroxyethyl (meth)acrylate, 2-hydroxypropyl (meth)acrylate, benzyl (meth)acrylate, cyclohexyl (meth)acrylate, glycidyl (meth)acrylate, isobonyl (meth)acrylate, trichloro di-acid phosphoxyethyl (meth)acrylate, and acid phosphoxy polyethylene glycol mono (meth)acrylate.

4. A liquid crystal display device, comprising:
a color filter having
a red-colored filter segment;
a green-colored filter segment;
a blue-colored filter segment; and
a yellow-colored filter segment,
wherein the yellow-colored filter segment is formed by using a yellow-colored composition including a yellow pigment, a pigment dispersant, and a pigment carrier consisting of a transparent resin, a precursor of the resin or a mixture thereof,
wherein the transparent resin includes a copolymer of a first compound represented by wherein $R_{14}$ denotes a hydrogen atom or a methyl group, $R_{15}$ denotes an alkylene group, $R_{16}$ denotes a hydrogen atom or an alkyl group having 1 to 20 carbon atoms, which may contain a substituent, and m is an integer of 1 to 15, and a second compound having an ethylenically unsaturated double bond; and a cold-cathode fluorescent tube light source, wherein the cold cathode fluorescent tube light source has spectral properties such that an emission intensity has a local maximum I3 at a wavelength λ3, which is within a wavelength range of 470 nm to 530 nm, and the emission intensity also has a maximum I4 at a wavelength λ4, which is within a wavelength range of 530 nm to 580 nm, and a ratio I3/I4 is between 0.2 and 0.7.

5. The liquid crystal display device according to claim 4, wherein the copolymer contains the first compound in an amount of 0.1 to 50% by weight.

6. The liquid crystal display device according to claim 4, wherein the second compound is selected from the group consisting of (meth)acrylic acid, methyl (meth)acrylate, (iso)propyl (meth)acrylate, (iso)butyl (meth)acrylate, (iso)pentyl (meth)acrylate, 2-hydroxyethyl (meth)acrylate, 2-hydroxypropyl (meth)acrylate, benzyl (meth)acrylate, cyclohexyl (meth)acrylate, glycidyl (meth)acrylate, isobonyl (meth)acrylate, trichloro di-acid phosphoxyethyl (meth)acrylate, and acid phosphoxy polyethylene glycol mono (meth)acrylate.

7. A liquid crystal display device, comprising:
a color filter having
a red-colored filter segment;
a green-colored filter segment;
a blue-colored filter segment; and
a yellow-colored filter segment,
wherein the yellow-colored filter segment is formed by using a yellow-colored composition including a yellow pigment, a pigment dispersant, and a pigment carrier consisting of a transparent resin, a precursor of the resin or a mixture thereof,
wherein the transparent resin includes a copolymer of a first compound represented by wherein $R_{14}$ denotes a hydrogen atom or a methyl group, $R_{15}$ denotes an alkylene group, $R_{16}$ denotes a hydrogen atom or an alkyl group having 1 to 20 carbon atoms, which may contain a substituent, and m is an integer of 1 to 15, and a second compound having an ethylenically unsaturated double bond; and a three-color LED light source, wherein the three-color LED light source has spectral properties such that an emission intensity has a maximum, I5, at a wavelength λ5, which is within a wavelength range of 430 nm to 485 nm, and the emission intensity also has a local maximum, I6 at a wavelength λ6, which is within a wavelength range of 530 nm to 580 nm, and a ratio of I6/I5 is between 0.2 and 0.7.

8. The liquid crystal display device according to claim 7, wherein the copolymer contains the first compound in an amount of 0.1 to 50% by weight.

9. The liquid crystal display device according to claim 7, wherein the second compound is selected from the group consisting of (meth)acrylic acid, methyl (meth)acrylate, (iso)propyl (meth)acrylate, (iso)butyl (meth)acrylate, (iso)pentyl (meth)acrylate, 2-hydroxyethyl (meth)acrylate, 2-hydroxypropyl (meth)acrylate, benzyl (meth)acrylate, cyclohexyl (meth)acrylate, glycidyl (meth)acrylate, isobonyl (meth)acrylate, trichloro di-acid phosphoxyethyl (meth)acrylate, and acid phosphoxy polyethylene glycol mono (meth)acrylate.

* * * * *